T. L. HARRIS.
SWINGLETREE GUARD.
APPLICATION FILED APR. 28, 1908.
908,666.
Patented Jan. 5, 1909.
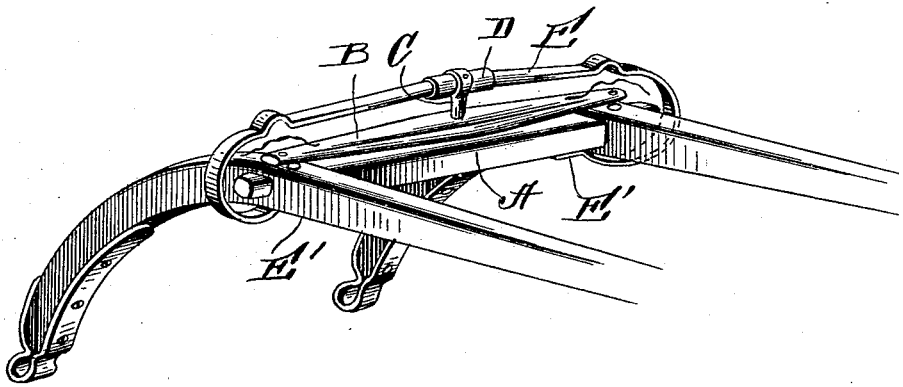
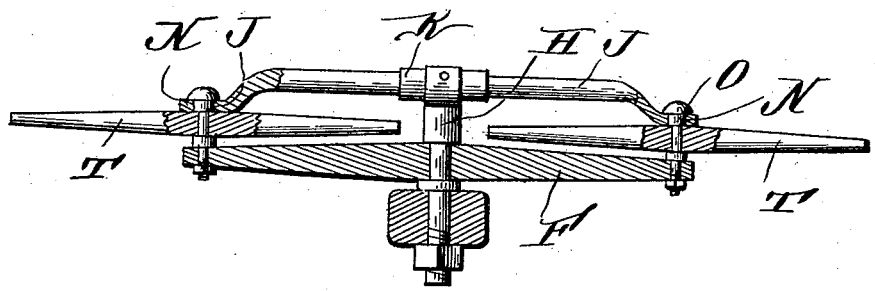
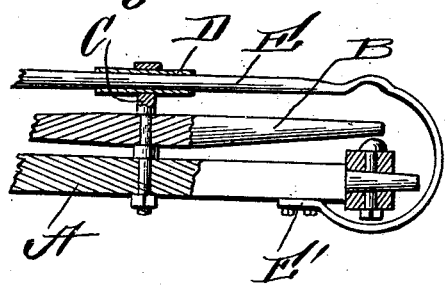

UNITED STATES PATENT OFFICE.

THOMAS LARNOR HARRIS, OF WRIGHTSVILLE, GEORGIA, ASSIGNOR OF ONE-HALF TO A. I. HAINES, OF WRIGHTSVILLE, GEORGIA.

SWINGLETREE-GUARD.

No. 908,666.     Specification of Letters Patent.     Patented Jan. 5, 1909.

Application filed April 28, 1908. Serial No. 429,713.

*To all whom it may concern:*

Be it known that I, THOMAS L. HARRIS, a citizen of the United States, residing at Wrightsville, in the county of Johnson and State of Georgia, have invented certain new and useful Improvements in Swingletree-Guards; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in guard for swingle trees and comprises means whereby reins are prevented from engaging over the ends of the swingle tree.

The invention consists of various details of construction, combinations and arrangements of parts which will be hereinafter fully described and then specifically defined in the appended claim.

I illustrate my invention in the accompanying drawings, in which:—

Figure 1 is a perspective view of my improved guard. Fig. 2 is a view showing the application to a double tree, and Fig. 3 is a sectional view.

Reference now being had to the details of the drawings by letter, A designates a cross-piece forming a portion of the running gear of a vehicle, and B designates a swingle tree pivotally mounted upon the eye bolt C receiving a collar D. E designates the guard rods which telescope within said collar and extend in the manner shown about the ends of the cross-piece A and are fastened at E' to the under surface thereof by means of bolts or other suitable fastening means.

In Fig. 2 of the drawings, I have shown the attachment or guard as applied to a double tree and poles and in which F designates a double tree having an eye bolt. H fixed centrally thereto and carrying the collar K in which the guard rods J telescope, the ends of said rods having eyes N for the reception of the bolts O which pass through the ends of the double tree and also through the swingle trees T.

From the foregoing, it will be noted that, by the provision of the guard means as illustrated, simple and efficient mechanism is afforded whereby driving reins may be prevented from catching underneath the ends of the swingle tree and at the same time the swingle tree is reinforced by the peculiar manner in which the parts are fastened thereto.

What I claim to be new is:—

In combination with a pair of thills, an eye bolt rising from a cross piece thereof, a swingle tree pivotally mounted upon said bolt, an open ended shell passing through and held within the eye of said bolt, a bar fastened in said shell and having its ends extending one over each of said shafts and fastened to the under edges thereof, as set forth.

In testimony whereof I hereunto affix my signature in the presence of two witnesses.

THOMAS LARNOR HARRIS.

Witnesses:
D. B. BURNS,
ROY PAGE.